Sept. 3, 1963 W. T. HAGE 3,103,001

LOGIC CONTROL UNIT FOR DATA COLLECTING, STORING, TRANSMITTING AND COMPUTING SYSTEM

Filed June 11, 1958 8 Sheets-Sheet 1

INVENTOR.
William T. Hage
BY
J.P. Moran
ATTORNEY

INVENTOR.
*William T. Hage*
BY
*[signature]*
ATTORNEY

INVENTOR.
William T. Hage
BY
J. P. Moran
ATTORNEY

Sept. 3, 1963 W. T. HAGE 3,103,001

LOGIC CONTROL UNIT FOR DATA COLLECTING, STORING, TRANSMITTING AND COMPUTING SYSTEM

Filed June 11, 1958 8 Sheets-Sheet 4

INVENTOR.
William T. Hage
BY
[signature]
ATTORNEY

INVENTOR.
William T. Hage
BY
J. P. Moran
ATTORNEY

DESTINATIONS OF SCANNER OUTPUT CIRCUITS FOR FUNCTIONS SHOWN

| SCANNER POSITION | PRELIMINARY DATA | INPUT ORDER | CHANGE CONTROL | DATA | OXYGEN ANALYSIS |
|---|---|---|---|---|---|
| 1 | O | 4 | 6 | O | O |
| 2 | TEST NO. SW | O | O | DATA FIG. 1000'S DECADE | O |
| 3 | " " " | O | O | " " 100'S " | O |
| 4 | MONTH " | O | O | " " 10'S " | O |
| 5 | " " | O | O | " " 1'S " | O |
| 6 | DAY SW | O | 2 | O " | O |
| 7 | " " | O | O | O " | O |
| 8 | TIME HRS. SW | O | O | DATA FIG. 1000'S DECADE | DATA FIG. 1000'S DECADE |
| 9 | " " " | 1 | 7 | " " 100'S " | " " 100'S " |
| 10 | TIME MIN. SW | O | O | " " 10'S " | " " 10'S " |
| 11 | " " " | O | O | " " 1S " | " " 1'S " |

FIG. 9

INVENTOR.
William T. Hage
BY
J P Moran
ATTORNEY

Sept. 3, 1963 W. T. HAGE 3,103,001

LOGIC CONTROL UNIT FOR DATA COLLECTING, STORING, TRANSMITTING AND COMPUTING SYSTEM

Filed June 11, 1958 8 Sheets-Sheet 7

INVENTOR.
William T. Hage
BY
J. P. Moran
ATTORNEY

INVENTOR.
William T. Hage
BY
J P Moran
ATTORNEY

United States Patent Office 3,103,001

Patented Sept. 3, 1963

3,103,001

LOGIC CONTROL UNIT FOR DATA COLLECTING, STORING, TRANSMITTING AND COMPUTING SYSTEM

William T. Hage, Alliance, Ohio, assignor to The Babcock & Wilcox Company, New York, N.Y., a corporation of New Jersey Filed June 11, 1958, Ser. No. 741,407
5 Claims. (Cl. 340—187)

This invention relates to logging or data transmission systems and, more particularly, to a novel control unit for such systems operable to effect progressive reading, in a predetermined sequence, of a plurality of variable magnitudes arranged in groups and to effect conversion of the individual magnitudes into coded magnitudes corresponding to numerical values representative of each individual magnitude.

Testing operations under constantly changing conditions, and requiring the taking of a plurality of readings at separate stations during a test, require personnel sufficient in number to assure all readings being taken at substantially the same time. Otherwise, the changing conditions over a period of time invalidate at least the earlier readings. The number of personnel required approaches the figure of one person for each station to be "read out."

A typical example of such an operation is the testing of a relatively large steam generator to determine the performance thereof with respect to such factors as steam flow, attemperation, feedwater heater bleeds, heat absorptions, exit gas temperature, overall efficiency, etc. This testing is effected by measuring temperatures, pressures, flow rates and drafts at numerous stations or locations, and analyzing flue gas at plural locations across the path of flow of the flue gas. The temperatures are measured by means of thermocouples, the pressures and flow rates are measured by suitable diaphragm devices which may convert the values into electric potentials, and the gas analysis is performed by suitable analyzers which may convert the analyses to electric potentials. A complete performance test of a large steam generator by present methods may require the services of seven men for about one week. Since five or six of these men are engineers normally assigned to duties other than testing, the making of such a test results in considerable disruption to normal engineering activities.

In accordance with the present invention, a novel logic and control unit is provided operable to sequentially and cyclically "read" or "interrogate" each of a plurality of sensing units, such as thermocouples, pressure voltage transducers, and electrically indicating gas analyzers, and to convert the "read" electrical potentials of the sensing units into coded characters, such as punch marks in a card or tape, corresponding to numerical values representative of the respective "readings" of "interrogations."

Preferably the several sensing elements at any test location or at physically adjacent test locations are grouped so that there are several groups of sensing elements. The output leads of the sensing elements of each group are connected to respective fixed contacts of a stepping switch, or similar device, whereby the grouped sensing elements may be interrogated step by step. Each stepping switch is a component part of a data-to-analog convertor or "analog unit," and each analog unit includes automatically operated slide wire means for balancing the potential of each sensing element and providing an analog unit output potential corresponding to the data value registered by each sensing element.

In operation, the control unit initially steps all the switches to the first position, interrogates the sensing element connected to the first position of the first switch, steps the first switch to its second position, interrogates the sensing element connected to the first position of the second switch, steps the second switch to its second position, and proceeds in a like manner to interrogate the sensing elements connected to the first positions of the succeeding switches. The same procedure is then repeated to read out, in succession, the sensing elements connected to the second positions of the switches, with each switch being stepped, in succession, to the third position after reading out of its second position. The operation continues until all the positions of all the analog units have been read out, at which time the operation may be terminated, or it may be cyclically repeated as many times as necessary or desirable in accordance with test conditions.

In interrogating each position of an analog unit, the logic and control unit applies the analog output potential to an analog-to-digital convertor, or "digitizer," which converts the measured analog output potential to a numerical representation by means of a counter including relay banks for each decimal place in the numerical representation. For example, if a four digit number is utilized, the counter will have four banks of ten relays each.

The logic control unit commits the digitizer output to a memory unit, thus releasing the digitizer for use in reading out the next data point, and then converts the memorized digitizer output into a punched card or tape code such as, for example, a teletype or computer tape code. In addition, the logic control unit also supplies special information to the data tape or card and energizes the tape or card punching magnets at the proper time.

The coded tape may be fed to an electronic computer which utilizes the input information to compute, for example, the heat absorptions, losses, and efficiency of a vapor generator. If the computer is at a remote location, the coded tape may be used to operate a teletypewriter which transmits the information over telephone or telegraph wires to such remote location where the receiving teletypewriter information is converted into a computer tape code. The computer output may be transmitted in a similar manner back to the test location.

For an understanding of the invention principles, reference is made to the following description of a typical embodiment thereof as illustrated in the accompanying drawing. In the drawing:

FIG. 9 is a table of the functions performed by the logic and control unit;

Figure 1:
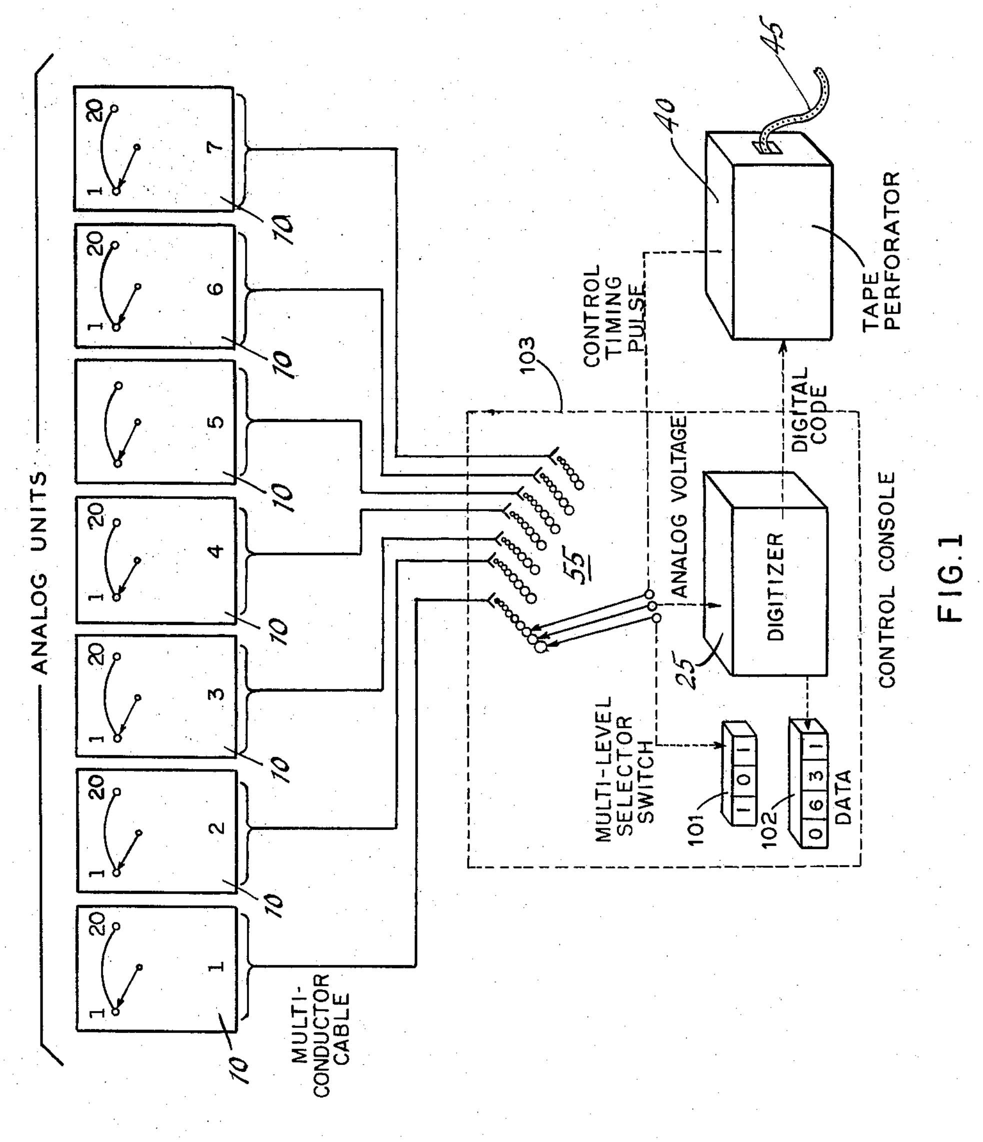
FIG. 1 is a schematic block diagram of a logging and tape perforating system incorporating the logic and control unit of the invention.
Figure 11:
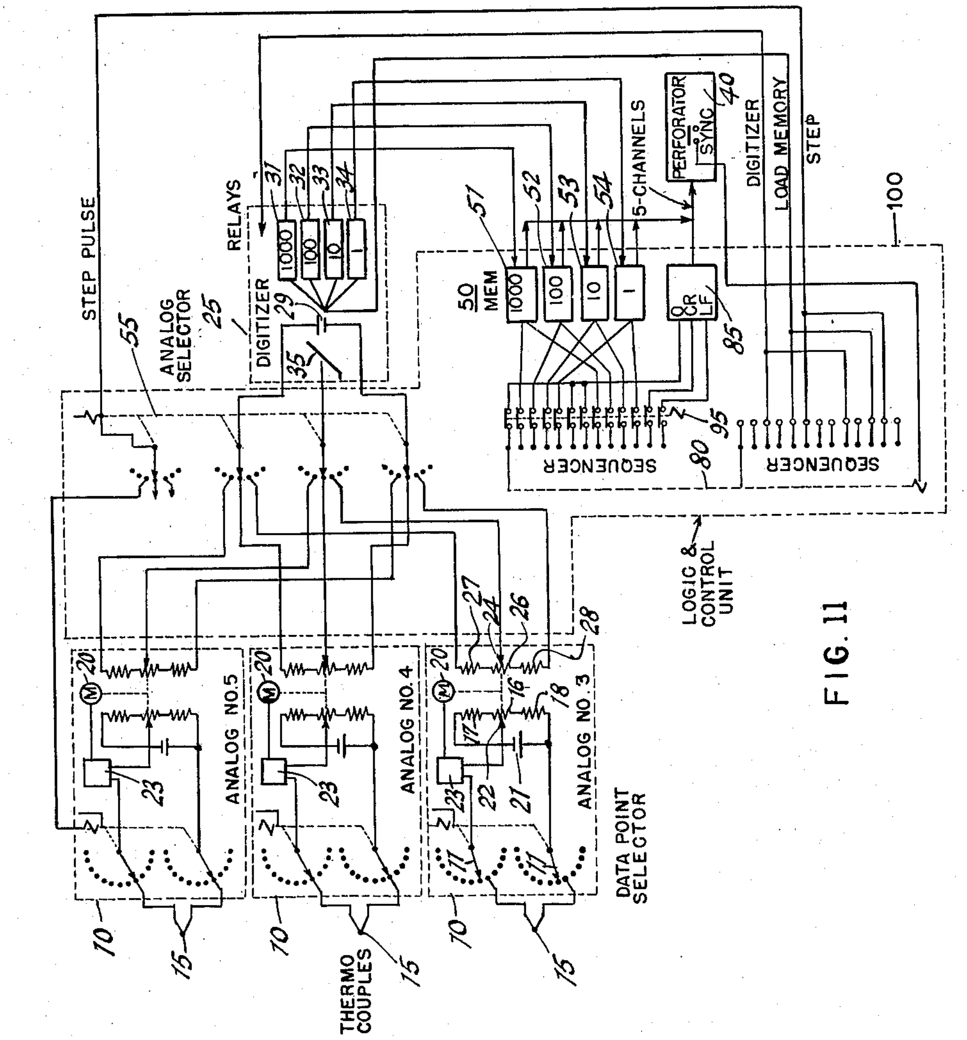
FIG. 11 is a schematic wiring diagram of the system shown in block form in FIG. 1, only the minimum number of identical or similar components sufficient to illustrate the operation of the invention being illustrated.

Referring to FIGS. 1 and 11, the control and logic unit 100 of the invention is illustrated as arranged to selectively apply, in a predetermined sequence, the output potentials of a plurality of analog units 10, which convert measured variable magnitudes into correspondingly varied output potentials, to the input of an analog-to-digital convertor, or "digitizer" 25 which converts such output potentials into stored numerical values. The logic and control unit 100 controls the transfer of the stored numerical values to mechanism, such as a tape perforator 40, which converts the information from the digitizer into numerical representations such as code indicia punched into a tape 45, which may be a teletype tape or an electronic computer tape. The numerical representations may also be displayed on a dial or counter.

As explained more fully hereinafter, logic and control unit 100 includes stepping switch means, scanning means, memory means, and selectively operable logic selecting relays, and performs the following functions during each cycle of operation:

(1) Steps the analog units 10 in a predetermined sequence.
(2) Sequentially applies the output potential of each analog unit to digitizer 25.
(3) Transfers the stored information from the digitizer to the memory means.
(4) Resets the digitizer.
(5) Connects the memory means into the converting mechanism to produce the numerical representations.
(6) Re-loads the memory means with the new information stored in the digitizer.
(7) Feeds special information to the converting mechanism.

The logic and control unit 100 thus operates as the "brain" of the system whereby a plurality of multiple-point analog units 10 may have their first points "read" and converted into numerical representations in sequence, and after each reading of an analog unit 10, such analog unit is stepped to its second point for balancing of its output potential against a potential representative of the magnitude of such output potential. After all the first points have been read, the second points of the analog units 10 are read in sequence with each analog unit being stepped to its third point, after "reading" of its second point, to obtain a new output potential, with this sequence being repeated until all the data points of all the analog units have been "read."

In storing information on a tape, such as the teletype tape 45 or a computer tape, several conventions must be observed. The data stored in the perforated tape 45 uses the digits zero through nine. The teletype system for example, is constructed to print only letters unless the information fed to the transmitter is preceded by an "upper case" code. Consequently, each set of numerical data perforated into a teletype tape, such as 45, must be preceded by such "upper case" code as its first character.

Furthermore, the teletype equipment contains means for direct conversion of teletype code to numerical data on a printed page. This necessitates that, the information punched on the tape contain carriage return and line feed instructions to the automatic teletype printer. In the invention system, each "word" perforated on tape 45, consisting of an algebraic sign plus ten digits, is followed by a coded line-feed and a carriage-return signal. The teletype code representing characters is in the form of holes punched in a tape. The standard teletype code uses five longitudinally extending parallel spaced channels, and each character is represented by a unique combination of holes and unpunched spaces in the respective channels. For instance, the digit "one" is represented by holes in the first, second, third and fifth channels of the tape, with there being an unpunched space in the fourth channel. These holes and the unpunched spaces are in line transversely of the teletype tape. The perforator 40 is a known mechanism which punches combinations of up to five holes simultaneously in one row transversely of tape 45.

While not limited to use therewith, the invention system has been tested in conjunction with a "Datatron" digital computer. This computer is designed to use a "word" of eleven characters consisting of ten digits preceded by a sign. As will be described more fully hereinafter, each "piece" of data information, punched into the tape 45, for example, contains four digits so that the rest of the "word" appearing on the computer tape must be filled in with zeros. The line-feed and carriage-return characters are ignored in the computer tape conversion operation. In addition, each word entering the computer must be preceded by a code indicating the sign (plus or minus) of the information. In view of the above requirements, the invention system, when feeding information to a teletype system, utilizes a word composed of the sign, two data values of four digits each, two zeros, a carriage-return code, and a line-feed code arranged in the following sequence:

| Position: | |
|---|---|
| 1 | Sign (zero=plus; one=minus). |
| 2, 3, 4, 5 | Four digit datum. |
| 6, 7 | Zeros. |
| 8, 9, 10, 11 | Four digit datum. |
| 12 | Carriage return (CR). |
| 13 | Line feed (LF). |

Each separate group of data, whether it be a single traverse or "scan" of all data points or several repeated "scans" must be preceded by a code "word" which commands the computer to start entering into its storage section the information contained on the following portion of the tape. Also, each group of data must be followed by a coded "word" which commands the computer to obtain its instructions from another source. Usually the new source commands the computer to stop entering the information into its memory or storage section. The "word" preceding the data group is called the "input order" and takes the following form:

40000000100CRLF

The number 4 tells the computer to make preparations for receiving tape-stored information, the fifth and sixth zeros tell the computer to start entering data into its storage or memory section, and the "100" indicates that the first data information is to be entered into the memory cell "100."

The "word" following a data group is called the "change of control" word and has the following form:

60000020700CRLF

The "6" tells the computer to stop the input device which, with the particular computer mentioned above, is a photoreader which converts holes in the computer tape to computer memory input signals. The "20" tells the computer to stop taking its commands from the tape and to take its commands from address "700" in its memory. A "stop" command is usually existing at the "700" address.

Each data group is preceded by a "word" called the "preliminary data" which gives, in a particular example, the number of the data group, the month, day and time.

Figure 2:
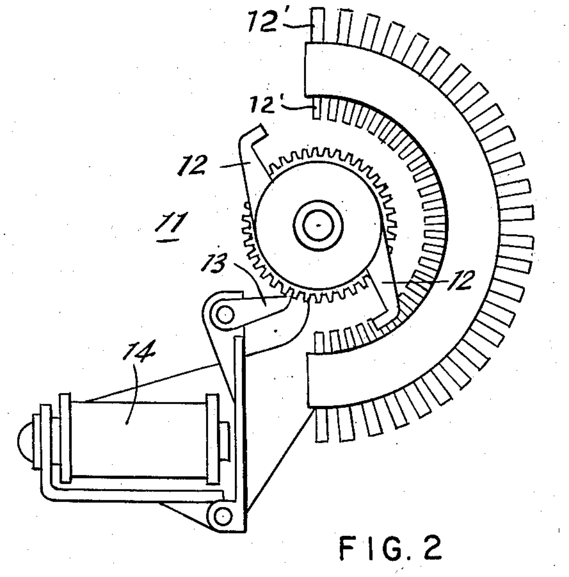
FIGS. 2 and 3 are side and end elevation views, respectively, of a multiple stepping switch which may be used with the logic and control unit of the invention, and incorporated in an analog unit for converting measured magnitudes into output potentials.
Figure 3:
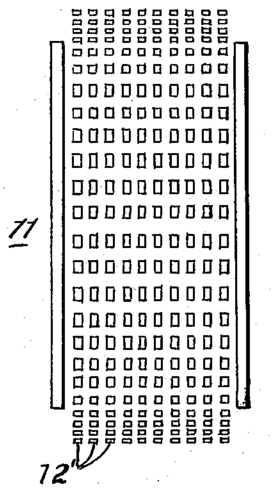

Before explaining the operation of the system as a whole, it will be helpful to describe the construction and operation of individual units which are under the control of the control and logic unit 100. Referring to FIGS. 2 and 3, each of the analog units 10 includes a stepping switch 11 which, in the illustrated example, may have ten (10) contacts at each of several levels, for example, twenty-five levels. In exemplary vapor generator performance analyses in which the invention system has been tested, each analog unit 10 is used to measure twenty (20) data sensing points individually and in sequence. The stepping switch 11 includes rotatable contact arms 12 which are stepped by a pawl 13 operated by a magnetic coil 14. Electric conductors connect the data sensing points, such as thermocouples 15, to the stationary contacts 12' of the stepping switch, and the rotatable contact arms connect each sensing unit in turn to the measuring or balancing system of the analog unit, shown in FIGS. 4 and 11.

Figure 4:
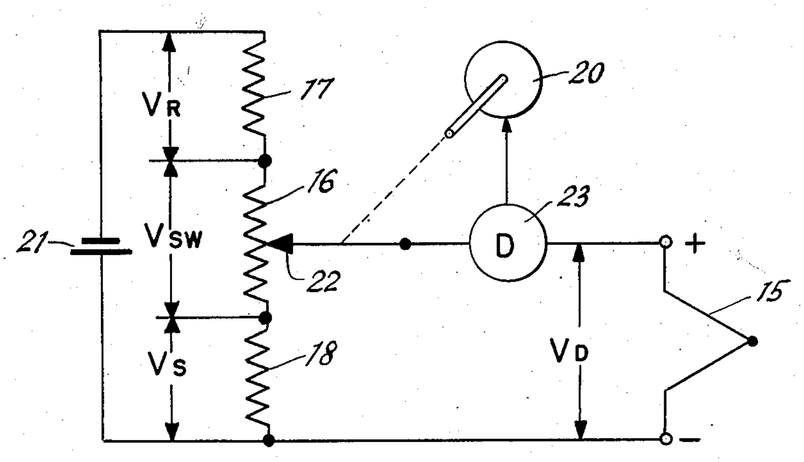
FIG. 4 is a schematic wiring diagram illustrating the potential balancing means of the analog unit.

Referring to FIG. 4, each analog unit 10 includes means for producing a voltage equal and opposite to the data signal voltage $V_D$ from the sensing element, such as thermocouple 15. This means comprises a source of potential connected across a variable resistance having a contact operated by a motor which is controlled by an error detector sensing the difference between the voltage drop across the variable resistance and the signal voltage. As the sensing elements, particularly thermocouples, sense temperatures varying over a relatively narrow range, the balancing arrangement includes not only the variable resistance, or slide wire, 16 but also a range resistance 17 and a suppression resistance 18. The voltage is supplied from a suitable D.C. source, such as a battery 21, whose terminals are connected across the resistances 17, 16 and 18 connected in series. A pointer or slide 22 operated by a motor 20 varies the value of the variable resistance 16. The direction and amount of operation of motor 20 in balancing the signal voltage is controlled by an error detector 23 which senses any differences between the value of the balancing voltage, as measured by pointer 22 with respect to its position along resistance 16, and the signal voltage from the thermocouple 15.

Connection of the slide wire resistance directly across the reference voltage is impractical as an effective reference voltage will have a value which is a large multiple of the output voltage of thermocouple 15. By way of example, if the thermocouple output is to range from 0 to 0.05 volt, representing 0 to 2200 F., with a one volt reference voltage, only 1/20 of the total length of resistance 16 would be used to cover the temperature range. To accommodate narrow temperature ranges and at the same time to make use of the full length of the slide wire resistance 16, the range and suppression resistances 17 and 18 are added as shown in FIG. 4. If, for example, range resistance 17 has a value of 19,540 ohms, slide wire 16 has a value of 100 ohms, and suppression resistance 18 has a value of 360 ohms then pointer 22, at the lower end of slide wire 16, "sees" a voltage of 18 millivolts representing about 800 F. At the upper end of slide wire 16, pointer 22 "sees" 23 millivolts or 1000 F., and the full length of the slide wire 16 is used for the 200 degree range.

The several sensing elements connected to any one analog unit 10 may require different range suppression values. Hence, range and suppression resistances of different values are switched into the circuit at each data point of the analog unit by means of the selector or stepping switch 11 of the analog unit. In operation, when any particular thermocouple is cut in by operation of switch 11, the error detector 23 measures the difference between the output voltage of the thermocouple 15 and the "reading" indicated by slide 22 on slide wire 16. The error detector 23 then causes motor 20 to operate pointer 22 in a direction to balance the slide wire voltage against the thermocouple voltage. This action will be referred to hereinafter as the "potential balancing action" of the analog unit.

Figure 5:
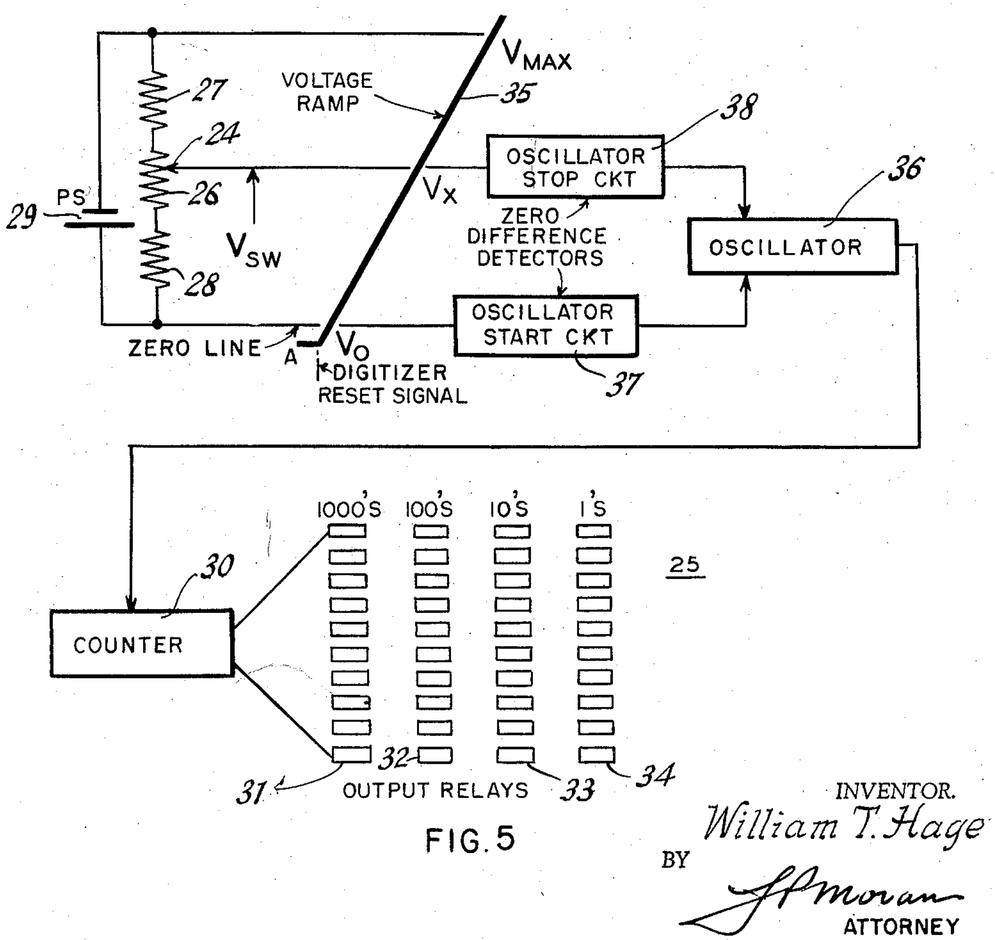
FIG. 5 is a schematic wiring diagram of the digitizer and a re-transmission circuit connected to an analog unit.

As shown in FIGS. 5 and 11, the motor 20 which drives the pointer 22 also operates a slide wire in a "re-transmission circuit" connected to the digitizer 25. This pointer 24 is movable over a slide wire 26 connected in series with a range resistance 27 and a suppression resistance 28. The digitizer 25 includes a potential source 29 which is connected across the three resistances 27, 26 and 28. As pointer 24 is operated by motor 20 conjointly with pointer 22, the slide wire of the digitizer has its pointer 24 adjusted therealong in coordination with the adjustment of pointer 22 along slide wire 16.

The lower end of the series of resistances 26, 27 and 28 represents zero, and the upper end represents 9999. Therefore, the position of pointer 24 along slide wire 26 will represent a percent of the total voltage across the whole circuit. Because the digitizer 25 reads out in a number containing four digits (or four decades) the number 99.99 is used as the upper limit and the decimal point is omitted. In feeding information to a computer the latter is programmed to insert the decimal point at the proper location. Because the percent voltage from slide wire 26 is an electrical value equal to the data value as measured by thermocouple 15, it may be stated that the input voltage to digitizer 25 is an analog of the data, and that digitizer 25 is thus a true analog converter.

It is the function of digitizer 25 to convert the output of the re-transmission circuit to a numerical value which can be used to provide the final numerical representation. Referring to FIG. 5, the digitizer 25 includes a "ramp generator" 35 which, on signal, produces a voltage which accurately increases at a constant rate with time from a small negative value to a voltage equal to the maximum voltage of power supply 29. The slide wire voltage $V_{SW}$ is shown intersecting the ramp voltage at $V_x$ and the power supply zero voltage is shown intersecting the ramp at $V_0$. In operation, a "reset" signal brings the ramp voltage to point A, which has a small negative voltage. The ramp voltage then begins to rise. When this voltage reaches the zero line, a zero difference detector 37 starts oscillator 36 which feeds million-a-second pulses into a counter 30 which counts each pulse. When the ramp voltage has reached the value $V_x$, another zero-difference detector 38, which is arranged to sense the difference between the ramp and slide contact voltages, stops oscillator 36. The system is so designed that it requires 9999 counts for the ramp to reach the maximum value of the voltage of power supply 29. Therefore, the number of counts stored in the output relays 31–34 of counter 30 is a number which gives the percent of the power supply voltage at the position of slide wire 24 along voltage ramp 35. The counter relays are arranged in four rows of ten relays each, the respective rows measuring units, tens, hundreds, and thousands. The counter 30 thus provides a decimal "readout" in four digits which is used to energize one relay 31–34 in each of the four rows of ten.

Referring to FIGS. 6–8, 10 and 11, the control and logic unit 100 includes an electrical "memory" 50 comprising relay groups 51, 52, 53 and 54 which are in decades and memorize respectively thousands, hundreds, tens and ones. The unit 100 also includes analog selector switch means 55 which may be, for example, one or more multipoint selector or stepping switches similar to the selector or stepping switch 11 of FIGS. 2 and 3. The principal control component of the control and logic unit 100 is a "scanner" or "sequencer" 80. Essentially, the unit 100, including the mentioned components thereof, comprises a variety of circuits all of which are composed of two functional components, namely diodes and relays.

As is known to those skilled in the art, a "memory" in electrical terms contains devices, such as relays, which will store information until this information is used to perform its function and the memory is relieved of its contents, or "dumped." The four memory units 51–54 accept decimal information from the four decades 31–34 of the digitizer, and store this information so as to release the digitizer to accept information from the succeeding data point. Thereby, the information from one action of the digitizer can be "read-out" from the memory units into perforator 40 and on to tape 45 while the digitizer is freed to receive the next data value. As the input to "memory" 50 is in decimal code whereas the information is to be stored in teletype code, a conversion matrix composed of diodes is necessary for each memory unit.

Figure 6:
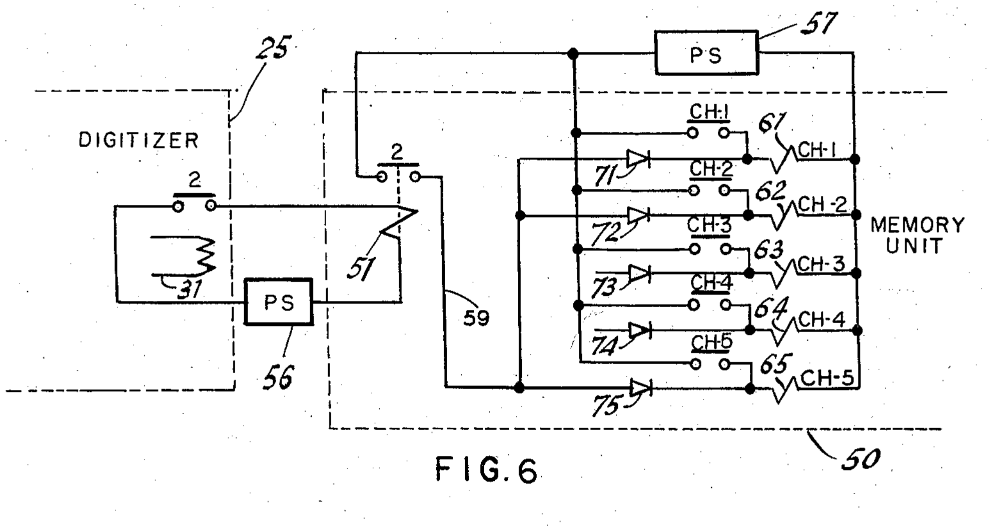
FIG. 6 is a partial schematic wiring diagram of the connection of the digitizer to the memory unit of the logic and control unit.

The input to any one memory unit 51–54 comes from one bank 31–34 of ten relays contained in the digitizer. For each data point, only one relay of the relay bank 31, 32, 33 or 34 is energized at a time. By way of a specific example, if it is assumed that a particular memory unit 51–54 is assigned to the most significant digit of a data "word" and if the data value is, for example, 2364, the number 2 relay of the thousands decade 31 will be energized and its contact closed. Upon receipt by the digitizer 25 of a "load memory" signal, the number 2 relay in the thousands decade 31 of the digitizer closes the number 2 relay in the thousands decade 51 of the memory unit through power supply 56. This connects the "2" line of the decimal-to-teletype diode matrix to the power supply 57 as shown in FIG. 6. The diode matrix line "2" connects diodes in teletype channels "1," "2" and "5" to teletype channel relays 61, 62 and 65 the supply of potential to these relays being through diodes 71, 72 and 75. This energizes the relays 61, 62 and 65 which then "latch in" through their contacts Ch–1, Ch–2 and Ch–5. The particular relays thus remain energized even after the "2" matrix line 59 is broken upon deenergization of the "2" relay in memory unit 51.

Figure 7:
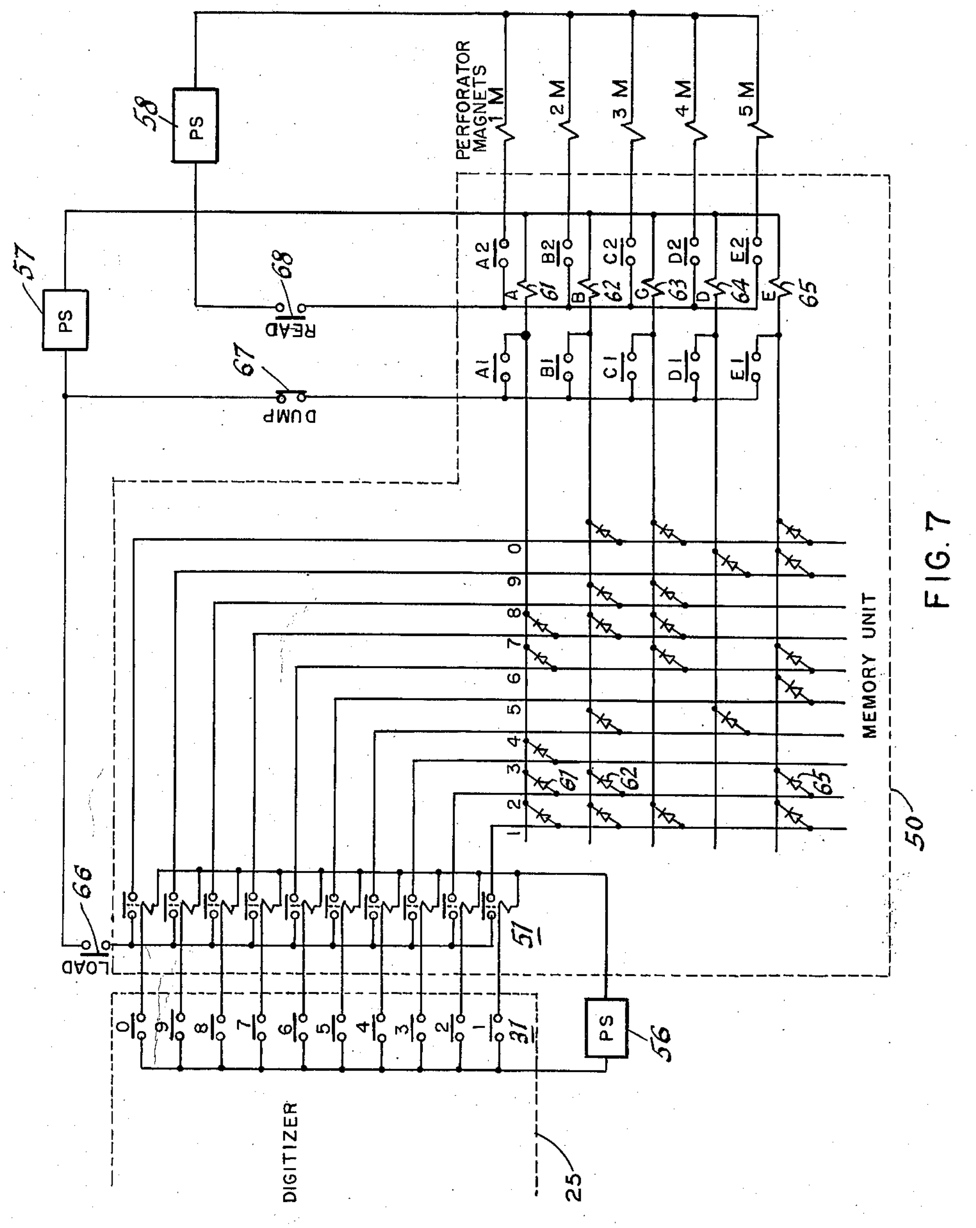
FIG. 7 is a schematic wiring diagram enlarging on FIG. 6.

FIG. 7 shows one complete matrix connected to one digitizer output decade 31 controlling memory decade 51. The "memory load," "memory dump" and "read" relay contacts 66, 67 and 68 are shown. Assuming, as in the description of FIG. 6, that the digit "2" has been counted in digitizer 25 and is to be "readout," the counter 30 will have caused the "2" contact in decade 31 of the digitizer to be closed. Hence, when "memory load" contact 66 is closed, the number "2" relay in memory relay decade 51 will be energized from power source 56 to connect power source 57 to line "2." It will be noted that line "2" is connected by diodes 61, 62 and 65 to channel lines 1, 2 and 5. Hence, relays 61, 62 and 65 will be energized from source 57 and will close their respective contacts A1 and A2, B1 and B2, and E1 and E2. Closure of contacts A1, B1 and E1 latches the relays 61, 62 and 65 so that they remain energized even if contact 66 is reopened to drop the "2" relay in decade 51.

When "read" contact 68 is closed, perforator magnets 1M, 2M and 5M will be energized from source 58 through closed contacts A2, B2 and E2 to punch the code for "2" into tape 45. Relays 61, 62 and 65 remain energized until "dump" contact 67 is opened to break the hold circuits for these relays.

Each of the thirteen "bits" or "characters" comprising a "word" is read in succession into the perforator magnets M by means of the sequencer or scanner 80 which obtains its synchronization from perforator 40, receiving one impulse at each revolution of the perforator drive shaft. This synchronizing pulse occurs at such a time in the perforator cycle as to enable scanner 80 to set up a coded bit in the perforator magnets M at the proper time to cause this code to be perforated in tape 45 at the end of the cycle.

The functions of the scanner 80 are as follows:

(1) Connect one side of the power supply in sequence to each of thirteen lines pertaining to the bits forming a word.
(2) Load and unload the four data memory units.
(3) Reset the digitizer.
(4) Step the analog-unit data point selector to the next step, after the data readout operation.
(5) Step the logic control unit to interrogate the succeeding analog unit.
(6) Provide a "completed word" signal to other circuits in the logic control unit.

Scanner 80 is essentially a ring counter, advancing through each of its thirteen steps for each synchronizing pulse received. If not stopped by external means at the thirteenth operation, scanner 80 will step from the thirteenth to the first position and repeat its cycle until stopped by removal of its driving pulse.

Figure 8:
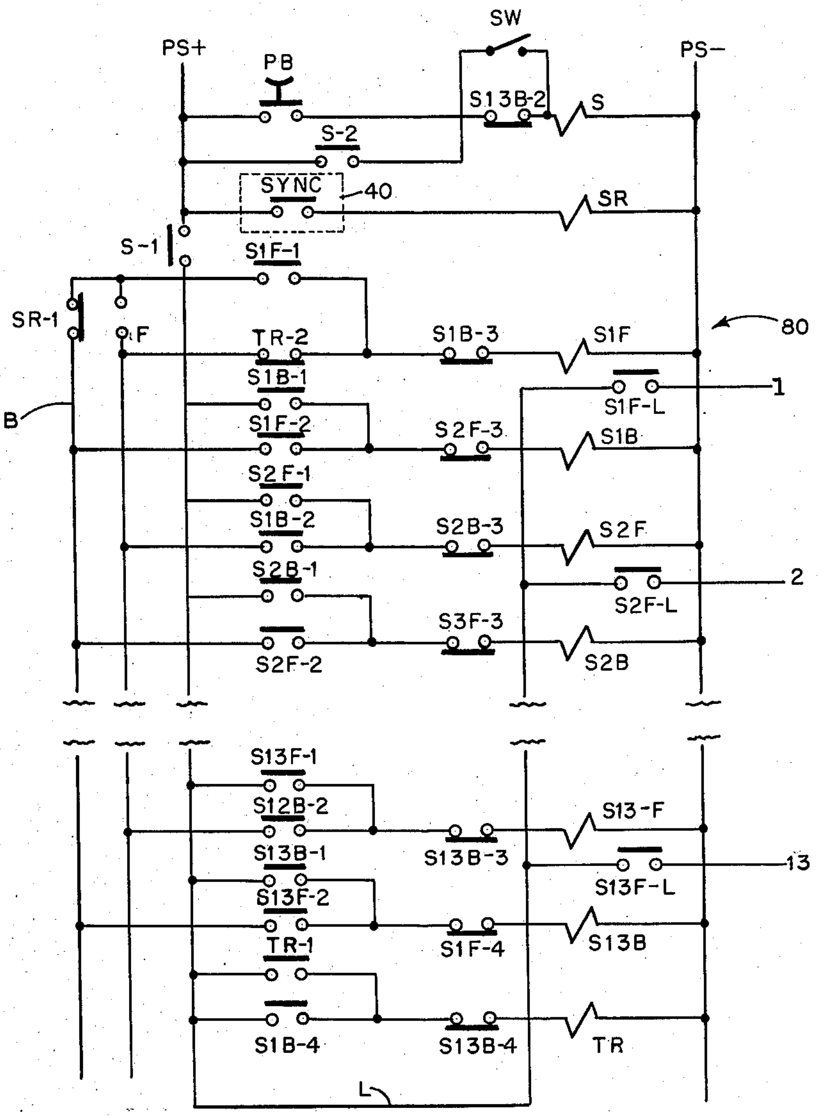
FIG. 8 is a schematic wiring diagram of the scanner of the logic and control unit.

Referring to FIG. 8, it will be noted that the scanner comprises a series of relays. The "Sync" contact in perforator 40 is closed once for each revolution of the perforator shaft to energize relay SR to shift its contact SR–1 from line B to line F. When the "Sync" contact is broken, relay SR is deenergized and contact SR–1 again connects line B to line PS+. Thus, for each revolution of the perforator shaft, the B and F lines are alternately energized.

Scanner 80 is energized through four lines. The lines PS+ and PS— are connected to opposite terminals of the power supply and are energized at all times during the scanner operation. The B line is energized only when relay SR is deenergized, and the F line is energized when relay SR is energized.

Each of the thirteen steps of scanner 80 requires two relays, resulting in a total of twenty-six relays for the thirteen steps of the scanner. Referring to FIG. 8, the relays numbered S1F through S13F are connected through other contacts to line F and thus can be picked up only when line F is energized. The relays S1B through S13B are connected through other contacts to the line B and thus can be energized only when relay SR is deenergized. A twenty-seventh relay T is the transfer relay which provides recycling at the end of the thirteen steps. When the scanner 80 is in operation, the relays S1F, S1B, S2F, S2B, etc. are energized in sequence. As each relay is energized, it opens the hold circuit of the preceding relay and closes a contact in the pick up circuit of the following relay.

For an understanding of the operation of the scanner, it can be assumed that the perforator 40 is operating and the "Sync" contact is being closed once each revolution of the perforator, resulting in contact SR–1 shifting between line F and line B. If push button PB is closed, relay S is energized and, if switch SW is closed, relay S is latched in the energized position by its contact S–2. At the start of the operation, relay SR is deenergized so that line B is connected to line PS+ through contacts SR–1 and S–1, which latter is closed upon energization of relay S. At the first pulse from perforator 40, the "Sync" contact closes, energizing relay SR which, through contact SR–1, disconnects line B from line PS+ and connects the latter to line F. This energizes relay S1F through the normally closed contact TR–2 of relay TR, and relay S1F is latched in the energized position by its contacts S1F–1.

The "Sync" contact is broken almost immediately, so that relay SR is dropped, again connecting line B to line PS+. At this time, contact S1B–1 is closed so that relay S1B is energized causing its contact S1B–1 to latch the relay between lines PS+ and PS—. At the same time, contact S1B–3 in the hold circuit of relay S1F opens deenergizing this relay. Contact S1B–4 closes to energize relay TR which holds itself in through contact TR–1 and, by means of normally closed contact TR–2 of the pickup circuit of relay S1F, prevents the operation of that relay until the end of the scanner cycle.

The second pulse from perforator 40 closing the "Sync" contacts again connects line F to line PS+. At this time, contact S1B–2 in the circuit of relay S2F is closed and this relay is picked up, closing its holding circuit at contact S2F–1 and opening the circuit of relay S1B at contact S2F–3. As the "Sync" contact reopens, line F is disconnected from line PS+ and line B is connected to the latter, by the dropping of relay SR. Relay S2B is now picked up through the closed contact S2F–2, and holds in through contact S2B–1. Contact S2B–3 opens to drop relay S2F.

Each time contact SR–1 connects line F to line PS+, through closing of the "Sync" contact to pick up relay SR, the next relay in the sequence is energized, closing a contact to the succeeding relay's circuit and breaking the hold circuit of the preceding relay. If contact SR–1 is dropped to reconnect line B to line PS+, the succeeding relay is energized and the preceding relay is deenergized. This gives rise to one step composed of two acts for each pulse of perforator 40. The stepping continues until relay S13B is energized which opens the circuit of relay TR at contact S13B–4. Relay TR recloses the pick up circuit of relay S1F at contact TR–2 so that, upon the next pulse, relay S1F can be again energized and the cycle repeated if switch SW is closed. If this latter switch is open, with contact S13B–2 also being opened due to energization of relay S13B, relay S is deenergized to disconnect line PS+ from the scanner through contacts S–1. Recycling can be obtained by closing switch SW.

The function of scanner 80 is to connect line L, which is connected to line PS+, to thirteen data lines in sequence through the respective contacts S1F–L through S13F–L closed when relays S1F through S13F are energized. The destination of the data lines is determined by the logic circuit described more fully hereinafter.

In addition to connecting each of the data lines to line L, the scanner accomplishes certain other functions. When relay S3F (not shown) is energized, it not only connects the number 3 data line to line L, but also, by means of another contact, closes a circuit which resets digitizer 25. When relay S5F is energized, it has the additional functions of unloading the old data value from memory 50 and loading memory 50 with a new data value obtained when digitizer 25 was reset upon energization of relay S3F.

When relay S6F is energized, it closes a set of contacts which steps, to its next position, the analog unit 10 from which the preceding data information was fed to digitizer 25, and steps analog selector switch 55 to the next analog unit 10 which is already in balance and ready to be read out to digitizer 25. When relay S9F is closed, the digitizer is reset the second time for reading out of the second data point. When relay S10F is energized, it dumps and reloads memory 50 the second time, and when relay S12F is energized, it steps the analog unit 10 then connected to digitizer 25 and steps analog selector switch 55 to the next analog unit 10. It will be noted that the operations of digitizing, loading and unloading memory 50, and stepping of the analog units 10 and analog selector switch 55 occur twice each cycle, thus providing the two data values or "words" which are read out in each cycle.

The destinations or routing of eleven of the thirteen readout lines sequentially energized by scanner 80 are controlled by selectively energizable "logic" relays, which are simply multiple control relays. In an analysis of the operation and performance of a steam generator, for example, five of these relays are used, and are respectively designated the "preliminary data," "input order," "change control," "data," and "oxygen analysis" relays. The table in FIG. 9 gives the routings or destinations for each of these relays.

The several relays are selectively energized, one at a time, by means of appropriate control switches on the "control console" of FIG. 1. The "preliminary data" relay is connected to special matrix 85 and also to presettable switches on the "control console" for setting the test number, month, day, hour, and minute of the test. The "input order" and "change control" relays are connected to special matrix 85. The "data" and "oxygen analysis" relays are connected to matrix 85 and also to memory unit 50.

Figure 10:
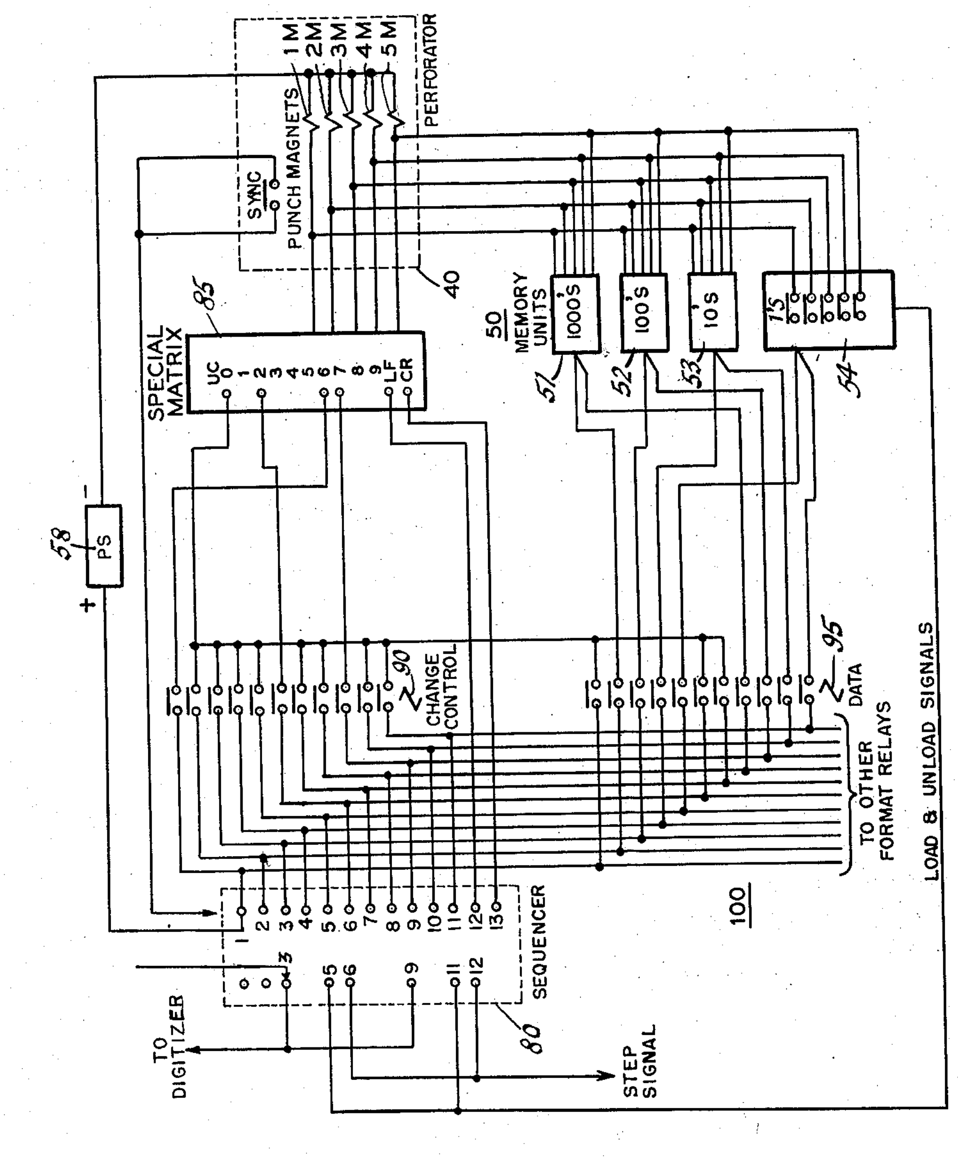
FIG. 10 is a schematic wiring diagram of the scanner, special matrix, memory unit, and perforator, illustrating two of the five logic relays.

Referring to FIG. 10, the action of scanner 80 while "data" relay 95 and "change control" relay 90 are successively energized will be described. Assuming that "data" relay 95 is energized and that data from an analog unit 10 (in the form of a value "1742," for example) has been loaded into memory 50, the analog selector switch 55 has stepped to the next analog unit 10, and the scanner 80 is at position 1. At this position, current flows from the positive terminal of source 58 through the top contact of relay 95 to the "zero" of matrix 85. In the matrix, the current branches through the diodes forming the teletype code for "zero" and then through perforator magnets (2M, 3M, 5M) to energize the magnets so that, on the first revolution of perforator 40, the "zero" code (2—3—5) is punched into tape 45. The current then returns to the negative terminal of source 58. Tape 45 is advanced one space and the "Sync" contacts are closed and then re-opened to advance scanner 80 to position 2.

In scanner position 2, current flows through the second contact of relay 95 to the 1000's memory decade 51 where the number "1" has been "memorized" by selectively closed relays in the form of the teletype code for "1." The current then flows through the closed contacts of these selectively energized relays to the perforator magnets (1M, 2M, 3M, 5M) to effectuate the punching of the "1" code (1—2—3—5) into tape 45.

When scanner 80 is stepped to position 3, current flows through the third contact of relay 95 to the 100's decade 52, where the number "7" has been memorized, and thence to the perforator magnets (1M, 2M, 3M) to effect the punching of the "7" code (1—2—3) into tape 45. At scanner position 3, a second line is energized to effect re-setting of digitizer 25, activating the digitizer to read and digitize the data from the analog unit to which the digitizer is now connected by selector switch 55.

At scanner position 4, current flows through 10's memory decade 53 to energize the perforator magnets (2M, 4M) to punch into tape 45 the teletype code (2—4) for "4," which is the numeral memorized by decade 53. Similarly, at scanner position 5, current flows through the 1's decade 54 of the memory to energize the perforator magnets to punch the "2" code (1—2—5) into tape 45. This completes the first data value, and "1742" has been punched into tape 45.

When scanner relay S5B is energized, power is supplied to a line which effects opening of "dump" contact 67 and "load" contact 66 (FIG. 7), to result in the relays of memory 50 dumping the data value "1742" and memorizing the new data value digitized when digitizer 25 was reset at scanner position 3.

At scanner positions 6 and 7, the current flows through the "zero" section of matrix 85 so that "0" is punched into tape 45 at each of these positions. In addition, a second line is energized at scanner position 6 to step selector switch 55 from the analog unit 10, digitized by resetting of the digitizer 25 at scanner position 3 and memorized by memory 50 when scanner relay S5B was energized, to the next analog unit 10. This action automatically steps the just vacated analog unit 10 to its next data point.

At scanner positions 8, 9, 10 and 11, the number which was loaded into memory 50 immediately after dumping of number "1742" is punched into tape 45 in the manner described in connection with scanner positions 2, 3, 4 and 5. In addition, the digitizer is reset at scanner position 9, as described for scanner position 3, and memory 50 is dumped and re-loaded at scanner position 11, as described for scanner position 5 upon energization of relay S5B. At scanner position 12, the selector switches 55 and 11 are stepped as at scanner position 6, while current is supplied to perforator 40 through the "line feed" section of special matrix 85. At scanner position 13, perforator 40 is energized through the "carriage return" section of special matrix 85, completing "reading" of the "word" into tape 45.

As each stepping switch 11 and 55 is stepped independently, means are provided for assuring that each switch is at its presupposed position at any time during the data taking operation. This is effected by providing contacts on the stepping switch 11 of each analog unit 10 and a contact on the analog selector switch 55 so that a "Sync" contact is made at the zero and twenty positions of each analog stepping switch 11. These contacts, together with conventional circuitry which has not been illustrated, serve to assure all the analog stepping switches and the analog selector switch 55 being "homed" to zero at the start of each data run, and that all the analog stepping switches 11 reach the position 20 at the end of the data run. This feature thus assures that each switch has stepped at the proper time during the data run.

If all analog stepping switches 11 and the analog selector switch 55 are not at zero after the "homing" action, the system will stop at that point in the cycle and data will not be taken. If, at the end of any one data taking cycle, all analog stepping switches are not in the position 20, an "out of Sync" light will be lit and repetition of the data taking cycle will not proceed automatically.

The logic and control unit 100 also provides for a visual display of the data point being interrogated and the numerical value of the data, which provides a means of checking the system when it is in operation. The data point indication is obtained from two levels of the stepping switch 11 in each analog unit 10 by means of a matrix, in the analog unit, which converts the position or level number to binary coded decimal notation. The analog positions, for example from 1 to 20, are resolved into configurations of six wires (not shown) coming from each analog unit 10. At the logic control unit end of these wires, the signals are re-converted to decimal code by means of a relay matrix and caused to light the data point indicating lights. The data point visual indicator 101, which consists of three numbers, is shown in FIG. 1. The first digit indicates the analog unit number and the last two numbers indicate the data point position of the stepping switch 11 in that particular analog unit. The first number is taken from a level of the analog selector switch 11 in the particular unit 10, and the second two numbers are obtained from the circuitry just described.

Visual indication of the data value is obtained directly from the digitizer readout relays in the memory units 51–54, contacts of these relays lighting appropriately numbered lights in indicator 102 (FIG. 1) to provide the data value indication.

The logic and control unit is also provided with push button selector switches, on-off switches and indicating lights, which have not been illustrated, to enable complete operation of the system from a single control console such as shown at 103 in FIG. 1. By pushing a "preliminary data" button, the "preliminary data" relay is energized, which results in reading into tape 45 of an upper case code, a zero, then ten information bits, as set on the ten preliminary data selector switches mounted in the control console, and finally the line-feed and carriage-return code. When the "data" button is pushed, all stepping switches 11 and 55 are moved to the zero position and, if synchronized, are stepped successively to position 1. This is effected by energization of the "data" relay 95. After four seconds delay for the first analog unit 10 to balance, the scanner 80 makes one "dry" run to load memory 50. On the next cycle of scanner 80, all the data will be read into tape 45 on a continuous basis.

A "single-cycle–repeat-cycle" switch is provided which, if on "single-cycle," will result in the data taking action ceasing after the last data point has been punched into tape 45. In the "repeat-cycle" position, the complete data cycle will be repeated until stopped, providing synchronization is indicated at the zero and last (such as twentieth) positions of the analog stepping switches 11. By pressing a "data stop" button, the data taking cycle may be interrupted at any time. However, it cannot be continued from that point in the cycle but must be restarted at data point 1. Provision is made for manually stepping the analog unit stepping switches and the analog stepping switch so that any data point may be selectively manually connected to the digitizer. The digitizer reset control permits reading out of the data into visual indicator 102. Perforator 40 cannot be operated on single data values and can be brought into operation only during the automatic readout operation.

The procedure in obtaining of oxygen analysis data, as during testing of a steam generator, differs because of the fact that the data points cannot be interrogated in rapid succession, as the oxygen analysis system requires one minute between successive readings. In order to accommodate the time lapse of one minute, a separate manual operation is required to read the oxygen-content data. When the "$O_2$" button is pushed, logic control unit 100 resets the oxygen analog to zero and starts a one minute time delay. At the end of the minute, the first oxygen data is taken using one thirteen bit word for each data value. As best illustrated in the table of FIG. 9, the missing data value is replaced by zeros when the "oxygen analysis" relay is energized. At the end of each data reading, the one-minute timer is recycled and the action is repeated.

For summarizing the preceding description, reference is made to FIG. 11 to illustrate the action of the system as it obtains temperature data from three thermocouples and converts these values to teletype code perforated on five channel tape.

The last half of the previous cycle of scanner 80 has just reset digitizer 25, at scanner position 9, loaded memory 50 with the data from position 5 of analog unit 3, stepped stepping switch 11 of analog unit 3 to position 6, and stepped analog selector switch 55 to analog unit 4. Scanner 80 is now in position 1, and data logic relay 95 is energized. Perforator 40, through the "Sync" contact, is causing scanner 80 to step through its thirteen positions which perform the following functions at each of the points numbered below.

(1) A zero is perforated into tape 45.
(2) The number in 1000's decade 51 is perforated into tape 45.
(3) The number in 100's decade 52 is punched into tape 45 and digitizer 25 is reset to digitize the slide wire position of analog unit 4 at its position or level 5.
(4) The 10's decade 53 is read into tape 45.
(5) The 1's decade 54 is read into tape 45, and memory 50 is "dumped" and reloaded from digitizer 25.
(6) A zero is read into tape 45 and analog selector switch 55 is stepped to analog unit 5, while at the same time, analog unit 4 is stepped to its position 6.
(7) A zero is read into tape 45.
(8) The 1000's decade 51 holding the first digit of analog unit 4, position 5, is read into tape 45.
(9) The 100's decade 52 is read into tape 45 and digitizer 25 is reset to digitize the data from analog unit 5, position or level 5.
(10) The 10's decade 53 is read into tape 45.
(11) The 1's decade 54 is read into tape 45, and memory 50 is "dumped" and reloaded from digitizer 25 with the information from position 5 of analog unit 5.
(12) A carriage return code is punched into tape 45, analog selector 55 is stepped to analog unit 6 (not shown), and analog unit 5 is stepped to its position or level 6.
(13) A line feed code is perforated into tape 45.

The system will continue to read out the fifth position or level of each analog unit 10 and step each analog unit to its sixth position or level, thus allowing the maximum time for each analog unit 10 to balance on its sixth position being interrogated. After each of the analog units 10 have been read at the sixth position or level, they are again read in sequence at the seventh position or level, and so forth, until all of the positions and levels of each of the analog units have been read.

While a specific embodiment of the invention has been shown and described in detail to illustrate the application of the invention principles, it will be understood that the invention may be embodied otherwise without departing from such principles.

What is claimed is:

1. In an apparatus for converting analog signals into corresponding digital representations, in combination, a plurality of selector switches each having a plurality of positions, circuitry for connecting each of said positions to a separate analog signal source, a digitizer for converting said analog signals into corresponding digital representations, a source of electric potential, cyclically operable control means energized by said source connecting each of said selector switches to said digitizer one after another, and including means advancing each selector switch one position immediately after the digitizer is disconnected therefrom and connected to the succeeding selector switch.

2. Apparatus as claimed in claim 1 wherein the analog signals are electrical potentials.

3. In an apparatus for converting analog signals into corresponding digital representations, in combination, a plurality of selector switches each having a plurality of positions, each position connected to a variable source of electric potential, a digitizer for converting the electric potentials into corresponding digital representations, a source of electric potential, cyclically operable control means energized by said source connecting each of said selector switches to said digitizer one after another for a predetermined increment of time and including means maintaining each selector switch stationary while the digitizer is connected thereto and advancing each selector switch one position immediately after the digitizer is disconnected therefrom and connected to the succeeding selector switch.

4. In a data logger for periodically logging in digit form the values of a plurality of physical quantities, in combination, a plurality of transducers arranged in groups, each transducer arranged to produce an electric signal corresponding in magnitude to the value of a separate one of the physical quantities, a selector switch having a plurality of positions for each of said groups of transmitters, circuitry for connecting each of the transducers in a group to a separate position of the associated selector switch, a digitizer for converting electrical potentials into corresponding digital representations, a source of electric potential, cyclically operable control means energized by said source successively connecting each of the selector switches to said digitizer for a predetermined increment of time, and including means maintaining a selector switch stationary while the digitizer is connected thereto and advancing the selector switch one position upon the digitizer being disconnected therefrom and connected to the succeeding selector switch.

5. Apparatus for continuously scanning a plurality of groups of electrical quantities, comprising in combination, an analog unit associated with each of said groups having a multiple-position selector switch and a null balance potentiometer connected thereto, circuitry for connecting each electrical quantity in any one group to an individual position of the selector switch in the analog unit associated with the group, a retransmitting slidewire operated by each of the null balance potentiometers for producing a potential corresponding to the magnitude of the electrical quantity then connected thereto through the selector switch, a digitizer for converting electrical potentials into corresponding digital representations, means for successively connecting each of the analog units to said digitizer for a predetermined increment of time and cyclically operable control means maintaining each selector switch stationary while the digitizer is connected thereto and including means advancing each selector switch one position upon the digitizer being disconnected therefrom and connected to the succeeding selector switch whereby the null balance potentiometer is substantially balanced during the time the analog unit is disconnected from the digitizer.

References Cited in the file of this patent

UNITED STATES PATENTS

| | | |
|---|---|---|
| 2,401,621 | Desch | June 4, 1946 |
| 2,504,931 | Knudsen | Apr. 18, 1950 |
| 2,655,625 | Burton | Oct. 13, 1953 |
| 2,656,524 | Gridley | Oct. 20, 1953 |
| 2,680,240 | Greenfield | June 1, 1954 |
| 2,736,006 | Langevin | Feb. 21, 1956 |
| 2,759,784 | Burke | Aug. 21, 1956 |
| 2,775,754 | Sink | Dec. 25, 1956 |
| 2,787,418 | MacKnight | Apr. 2, 1957 |
| 2,828,482 | Schumann | Mar. 25, 1958 |
| 2,835,884 | Markow | May 20, 1958 |
| 2,839,737 | Dalglish | June 17, 1958 |
| 2,872,670 | Dickinson | Feb. 3, 1959 |
| 2,875,427 | Koppel | Feb. 24, 1959 |
| 2,908,894 | Kienast | Oct. 13, 1959 |
| 2,981,107 | Anderson | Apr. 25, 1961 |